(12) United States Patent
Kawamoto et al.

(10) Patent No.: US 6,524,203 B2
(45) Date of Patent: Feb. 25, 2003

(54) POWER TRANSMISSION DEVICE OF ENGINE (75) Inventors: Yuichi Kawamoto, Akashi (JP); Kiyohito Takano, Kobe (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 0 days.

(21) Appl. No.: 09/859,354

(22) Filed: May 17, 2001

(65) Prior Publication Data
US 2001/0044351 A1 Nov. 22, 2001

(30) Foreign Application Priority Data
May 17, 2000 (JP) ........................ 2000-145007

(51) Int. Cl.⁷ .............................................. F16H 57/02
(52) U.S. Cl. ...................................................... 474/144
(58) Field of Search ............................ 476/34; 74/417; 474/8, 11, 18, 144; 475/210

(56) References Cited
U.S. PATENT DOCUMENTS
4,463,823 A * 8/1984 Tsuboi ........................ 180/226
4,527,443 A * 7/1985 Ohoka ......................... 74/417
4,915,189 A * 4/1990 Sakai ........................... 180/247

FOREIGN PATENT DOCUMENTS
JP          61263828 A      11/1986
JP          63071424 A       3/1988
JP          3-117761    *    5/1991   .......... F16H/57/02

* cited by examiner

Primary Examiner—Thomas R. Hannon
Assistant Examiner—Vicky A. Johnson
(74) Attorney, Agent, or Firm—Marshall, Gerstein & Borun (57) ABSTRACT In a power transmission device of an engine, an opening 37 is formed in a gear case 36 to allow an output shaft 11 to be pulled out of the gear case 36 from one end of the output shaft 11 toward the other end thereof. A lid member 33 is removably attached to the gear case 36 such that it covers the opening 37. The first support member 13 is removably attached to the gear case 36 for rotatably supporting the output shaft 11. A first shim 15 is interposed between the first support member 13 and the gear case 36. A second support member 23 is removably attached to the gear case 36 for rotatably supporting the drive shaft 21. A second shim 25 is interposed between the second support member 23 and the gear case 36.

6 Claims, 5 Drawing Sheets

PRIOR ART

Fig.5

POWER TRANSMISSION DEVICE OF ENGINE

BACKGROUND OF THE INVENTION

1. Field of the Invention

The present invention relates to a power transmission device of an engine and, more particularly to a power transmission device of an engine having a mechanism for changing a rotational direction of output of the engine by substantially 90 degrees.

2. Description of the Related Art

There are various types of engines according to uses. For example, an engine includes a drive shaft extending in a direction orthogonal to a crank shaft of the engine. Such an engine is adopted as an engine of a shaft drive type motor cycle, an engine of a straddle-type four wheel all terrain vehicle, or the like.

Figure 5:
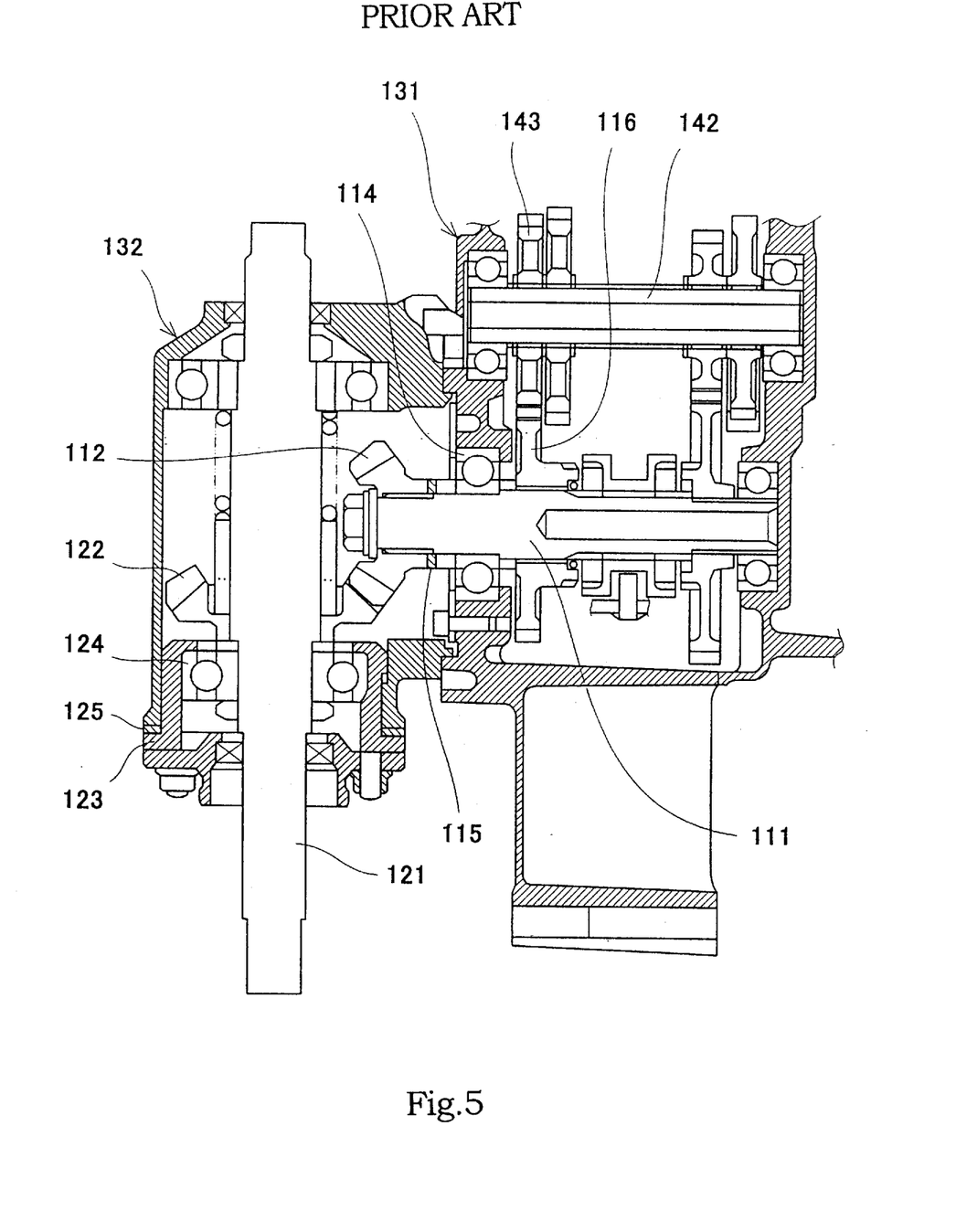
FIG. 5 is a cross-sectional view showing a portion of an engine using the conventional power transmission device of the engine.

FIG. 5 is a cross-sectional view showing a portion of an engine of a straddle-type four wheel all terrain vehicle, including a drive shaft 121 and its vicinity. In this engine, a gear-type transmission unit is accommodated in a gear case portion 131 integrated with a crank case. A counter shaft 142 of the gear-type transmission unit is shown in FIG. 5. A spur gear 143 is attached to the counter shaft 142 for transmitting power from an input shaft (not shown) of the gear-type transmission unit to an output shaft 111 of the gear-type transmission unit. The output shaft 111 of the gear-type transmission unit is rotatably supported by the gear case portion 131 of the crank case via a bearing 114. A spur gear 116 is fixed to the output shaft 111 for driving the output shaft 111. The spur gear 116 is in mesh with the spur gear 143 of the counter shaft 142. Thereby, a rotational driving force of the spur gear 143 is transmitted to the output shaft 111.

A gear case 132 is removably attached to the gear case portion 131 of the crank case. The gear case portion 131 and the gear case 132 are separate portions. A driving bevel gear 112 is attached to a tip end portion of the output shaft 111. The tip end portion of the output shaft 111, together with the driving bevel gear 112, protrudes from the gear case portion 131 of the crank case and is accommodated in the gear case 132. A drive shaft 121 is rotatably supported by the gear case 132. A driven bevel gear 122 provided on the drive shaft 121 is accommodated in the gear case 132.

More specifically, the driven bevel gear 122 is fixed to the drive shaft 121. The drive shaft 121 is rotatably supported by a support member 123 via a bearing 124. The support member 123 is attached to the gear case 132. A portion of the drive shaft 121, including the driven bevel gear 122, is accommodated in the gear case 132. Since the driven bevel gear 122 is in mesh with the driving bevel gear 112, a direction of a rotational driving force of the output shaft 111 is changed by 90 degrees and the resulting force is transmitted to the drive shaft 121 in the gear case 132.

An adjustment shim 115 is attached on a rear face of the driving bevel gear 112. The adjustment shim. 115 enables adjustment of an axial position of the driving bevel gear 112 with respect to the output shaft 111. An adjustment shim 125i, is interposed between the gear case 132 and the support member 123. These shims 115, 125 serve to adjust tooth contact between the driving bevel gear 112 and the driven bevel gear 122. The shims 115, 125 are changed among shims having various thicknesses to select the shims 115, 125 having thicknesses for preferable tooth contact between the driving bevel gear 112 and the driven bevel gear 122.

However, the power transmission device of the engine described above have the following problems.

(1) Since the gear case 132 as the part separable from the crank case is placed laterally of the crank case, a lateral width of the engine and weight of the engine are increased. In addition, since the gear case 132, i.e., a member different from the crank case is necessary, the number of parts of the engine and a manufacturing cost thereof are increased.

(2) When the shim 115 is changed or checked after the gear case 132 into which the drive shaft 121 has been assembled is attached to the gear case portion 131 of the crank case, a burdensome operation, i.e., removal of the gear case 132 including the drive shaft 121 from the crank case, becomes necessary. In particular, in a case where an engine has been assembled into a vehicle, the removal of the gear case 132 from the crank case is very burdensome.

As an example of a structure of a compact engine, it is known that a drive shaft is provided in a gear case portion of a crank case and a driven bevel gear of the drive shaft is accommodated in the gear case portion of the crank case. In this case, the tooth contact adjustment between the bevel gears is not necessarily easy, including the need for disassembly of the crank case, and its structure is complex. Such a related art is disclosed in Japanese Laid Open Patent Publication No. Sho. 63-71424, Japanese Laid Open Patent Publication No. Sho. 61-63828.

SUMMARY OF THE INVENTION

The present invention has been developed for obviating the above-described problems and an object of the present invention is to provide a power transmission device of an engine, which is lightweight, has few parts, and realizes a reduced width of the engine and easy adjustment of tooth contact between bevel gears when applied to the engine.

To solve the above-described problems, there is provided a power transmission device of an engine comprising: an output shaft of a gear-type transmission unit which is provided in parallel with a crank shaft of the engine and provided with a driving bevel gear at one end thereof, a driving force from the crank shaft being transmitted to the output shaft; a drive shaft placed in a direction orthogonal to the output shaft and provided with a driven bevel gear which meshes with the driving bevel gear; a gear case formed integrally with a crank case for accommodating the gear-type transmission unit and supporting a shaft situated in a previous stage of the output shaft at both ends of the shaft; a lid member; a first support member; a first shim; a second support member; and a second shim; wherein an opening is formed in the gear case to allow the output shaft to be pulled out of the gear case in a direction from the one end of the output shaft toward the other end thereof, the lid member is removably attached to the gear case such that it closes the opening, the first support member is removably attached to the gear case for rotatably supporting the output shaft, the first shim is interposed between the first support member and the gear case, the second support member is removably attached to the gear case for rotatably supporting the drive shaft, and the second shim is interposed between the second support member and the gear case.

Since the gear case and the crank case are integrally formed as described above, the engine can be made compact and the number of parts of the engine can be reduced. In particular, a width of the engine can be reduced. Besides, the first support member supporting the output shaft, and hence the first shim, can be taken out of the gear case through the opening by detaching the lid member from the gear case.

Consequently, change and check of the first shim becomes easy. To form the gear case integrally with the crank case, for example, the crank case including the gear case as a portion of crank case may be manufactured by molding aluminum alloy.

It is preferable that in the power transmission device of the engine, the engine comprises a belt-type transmission unit for transmitting the driving force of the crank shaft to the gear-type transmission unit, and the drive shaft is situated in the gear case between the belt-type transmission unit provided in a side portion of the crank case and the gear-type transmission unit provided in the gear case. With such a structure, a dimension of the engine in a width direction thereof can be reduced.

It is preferable that in the power transmission device of the engine, the first support member supports the output shaft at a central portion thereof to prevent the output shaft from moving in an axial direction thereof, the output shaft is provided with the driving bevel gear in the gear case, which is situated closer to the belt-type transmission unit than the first support member, the output shaft is provided with a gear for driving the output shaft in the gear case, which is situated farther from the belt-type transmission unit than the first support member, the gear case has the opening formed laterally of the gear for driving the output shaft, and the opening is sufficiently large to allow the gear for driving the output shaft and the first support member to pass therethrough. With such a structure, shim adjustment in the axial direction of the output shaft becomes especially easy.

It is preferable that in the power transmission device of the engine, the gear case includes a support boss having a support hole inside thereof, the first support member includes a shaft portion for supporting the output shaft via a bearing and a flange portion having a flange face facing toward an axial direction of the output shaft, the shaft portion of the first support member is inserted into the support hole, and an end face of the support boss and the flange face of the first support member are connected via the first shim to allow an axial position of the output shaft with respect to the gear case to be regulated.

It is preferable that in the power transmission device of the engine, the second support member supports the drive shaft to prevent the drive shaft from moving in an axial direction thereof, a fitting hole is formed in a wall portion of the gear case which has a wall face substantially orthogonal to the drive shaft such that the fitting hole is sufficiently large to allow the driven bevel gear to pass therethrough, and the second support member is removably fitted to the fitting hole. With such a structure, shim adjustment in the axial direction of the drive shaft becomes especially easy.

It is preferable that in the power transmission device of the engine, the second support member includes a shaft portion and a flange portion having a flange face facing toward an axial direction of the drive shaft, a fitting face is formed in the vicinity of the fitting hole in an outer wall face of the gear case such that the fitting face is opposed to the flange face of the second support member, the shaft portion of the second support member is fitted into the fitting hole, and the fitting face and the flange face of the second support member are connected via the second shim to allow an axial position of the drive shaft with respect to the gear case to be regulated.

These objects as well as other objects, features and advantages of the invention will become apparent to those skilled in the art from the following description with reference to the accompanying drawings.

DETAILED DESCRIPTION OF THE PREFERRED EMBODIMENTS

Hereinafter, an embodiment of the present invention will be described with reference to accompanying drawings.

Figure 1:
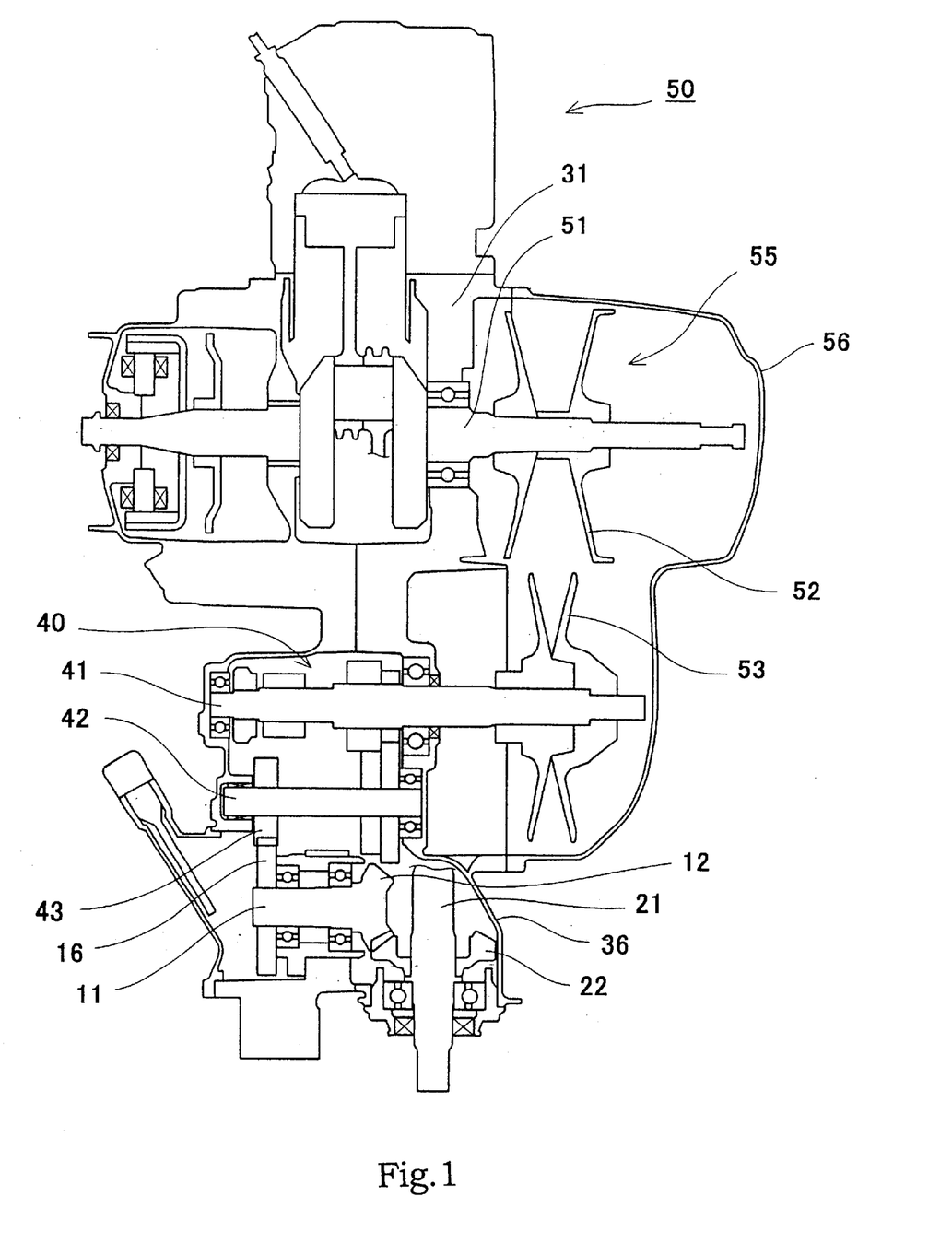
FIG. 1 is a cross-sectional view showing an engine using a power transmission device of an engine according to an embodiment of the present invention.

FIG. 1 is a cross-sectional view showing an engine 50 to be applied to a straddle-type four wheel all terrain vehicle or the like. The straddle-type four wheel all terrain vehicle travels on sandy soil, rough terrain, rocky hills, and terrain with puddles of muddy water or the like. The straddle-type four wheel all terrain vehicle is also referred to as ATV for short. A power transmission device of an engine according to the embodiment of the present invention is adopted in the engine 50 of FIG. 1.

A driving pulley 52 of a belt-type automatic transmission unit (belt converter) 55 is attached to a crank shaft 51 of the engine 50. The engine 50 includes a gear-type transmission unit 40 inside thereof. A driven pulley 53 is attached to an input shaft 41 of the gear-type transmission unit 40. The pulleys 52, 53 are connected by means of a belt (not shown). Thereby, a rotational driving force of the crank shaft 51 is transmitted to the input shaft 41 of the gear-type transmission unit 40 via the belt converter 55. Each of the pulleys 52, 53 is placed in a side portion of the engine 50 and covered by a cover 56.

A gear 43 is fixed to a counter shaft 42 of the gear-type transmission unit 40 for transmitting power from the counter shaft 42 to the output shaft 11. The output shaft 11 is provided with a driving bevel gear 12 at one end thereof situated closer to the belt converter 55. A gear 16 is attached to the other end of the output shaft 11 (an end apart from the belt converter 55) for driving the output shaft 11. Since the gear 43 of the counter shaft 42 and the gear 16 for driving the output shaft 11 are in mesh with each other, the rotational driving force of the counter shaft 42 is transmitted to the output shaft 11. That is, the counter shaft 42 is a shaft situated in a previous stage of the output shaft 11.

The engine 50 also includes a drive shaft 21 placed in a direction orthogonal to the output shaft 11 of the gear-type transmission unit 40. The drive shaft 21 is connected to a propeller shaft (not shown). The drive shaft 21 is provided with a driven bevel gear 22. Since the driving bevel gear 12 and the driven bevel gear 22 are in mesh with each other, a direction of the rotational driving force of the output shaft 11 of the gear-type transmission unit 40 is changed by 90 degrees and the resulting force is transmitted to the drive shaft 21. A gear case 36 is formed integrally with a crank case 31 as a portion of the crank case 31 for accommodating the gear-type transmission unit 40 and the driven bevel gear 22 of the drive shaft 21. More specifically, the crank case 31 has a crank chamber portion for accommodating the crank shaft 51 and the gear case portion 36 for accommodating the gear-type transmission unit 40 and the drive shaft 21, and the crank chamber portion and the gear case portion 36 are formed integrally with each other by molding aluminum. The counter shaft 42 has opposite ends supported by the gear case 36.

Figure 2:
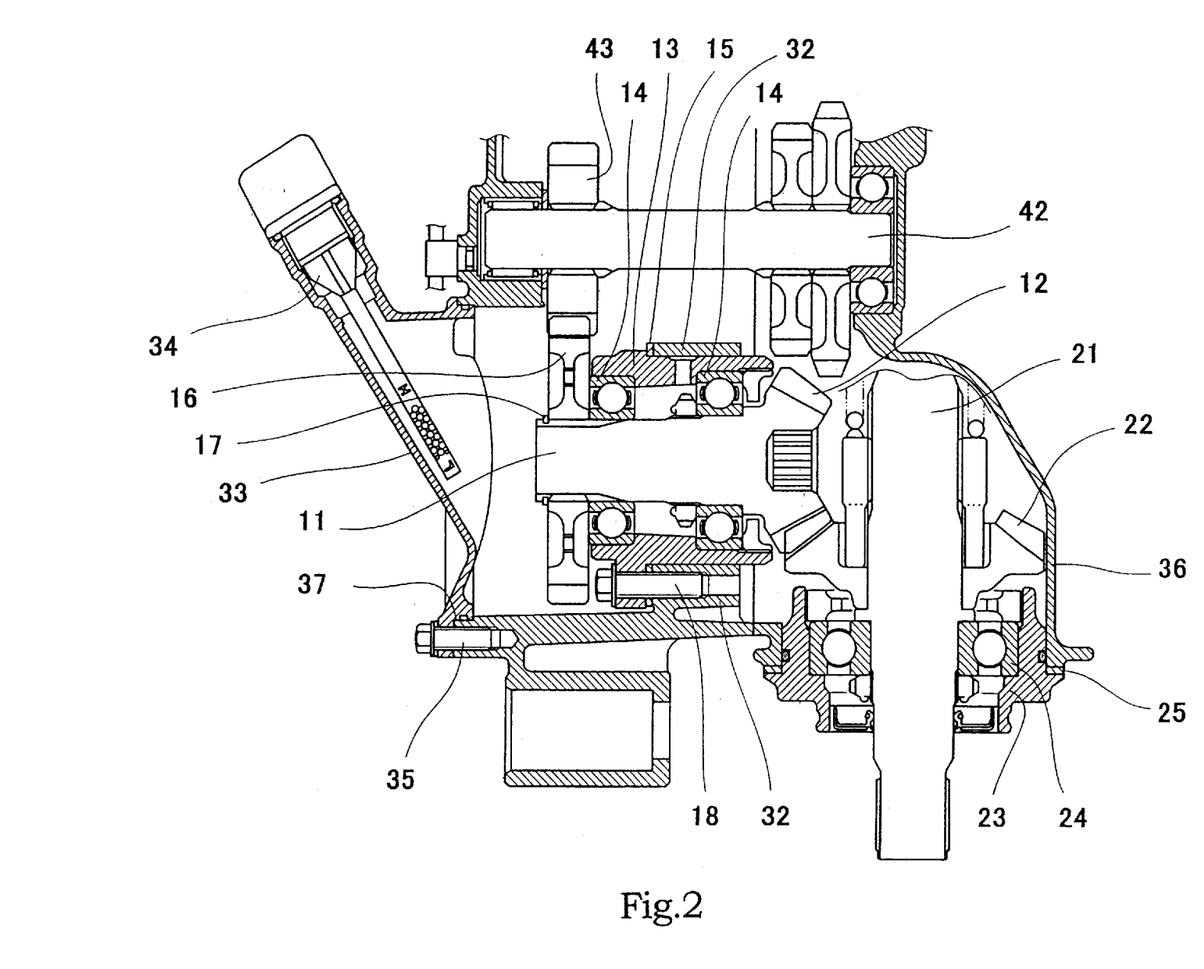
FIG. 2 is a cross-sectional view showing a portion of the engine of FIG. 1.
Figure 3:
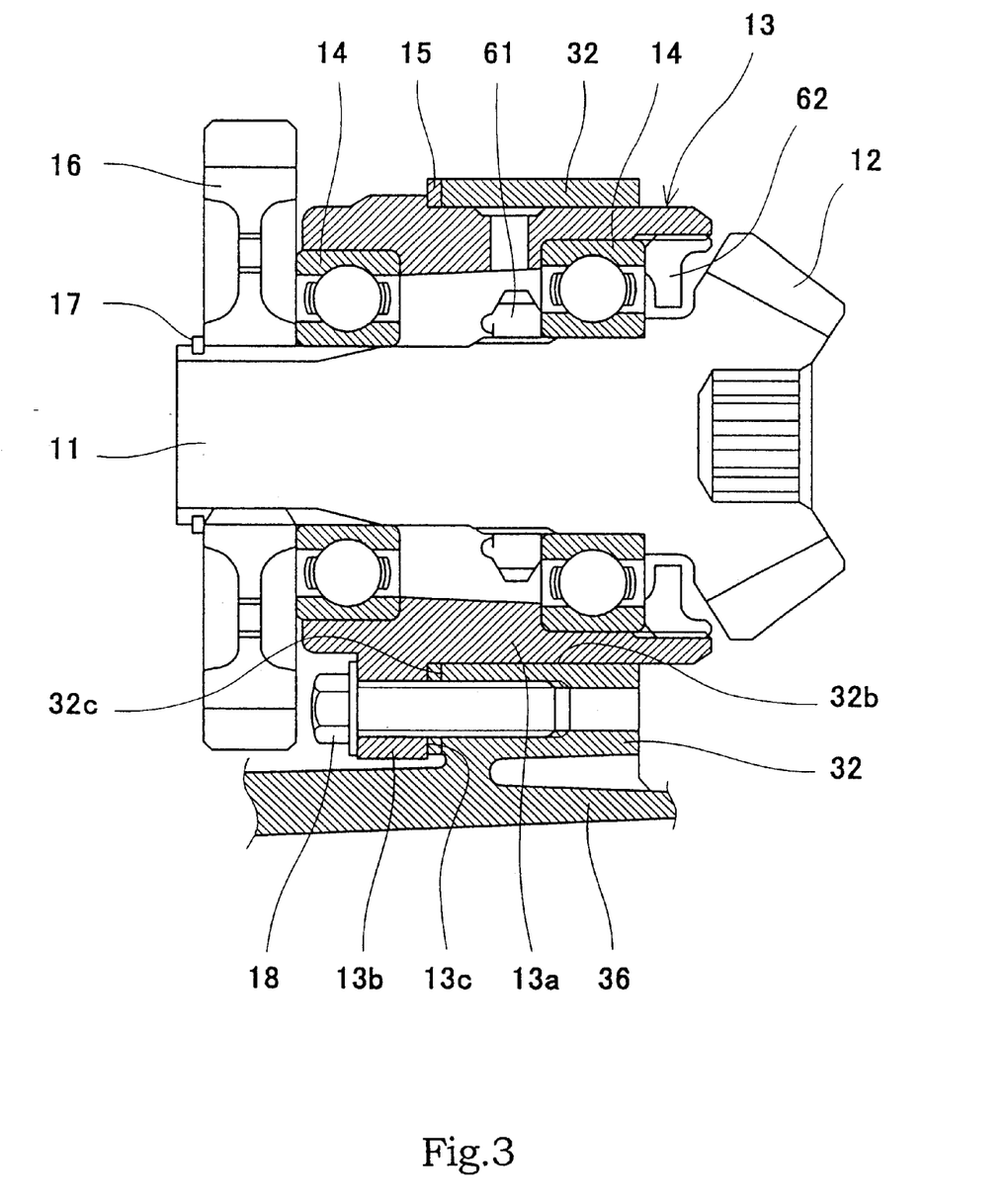
FIG. 3 is an enlarged cross-sectional view showing a portion of the engine of FIG. 1, including a first support member and its vicinity.
Figure 4:
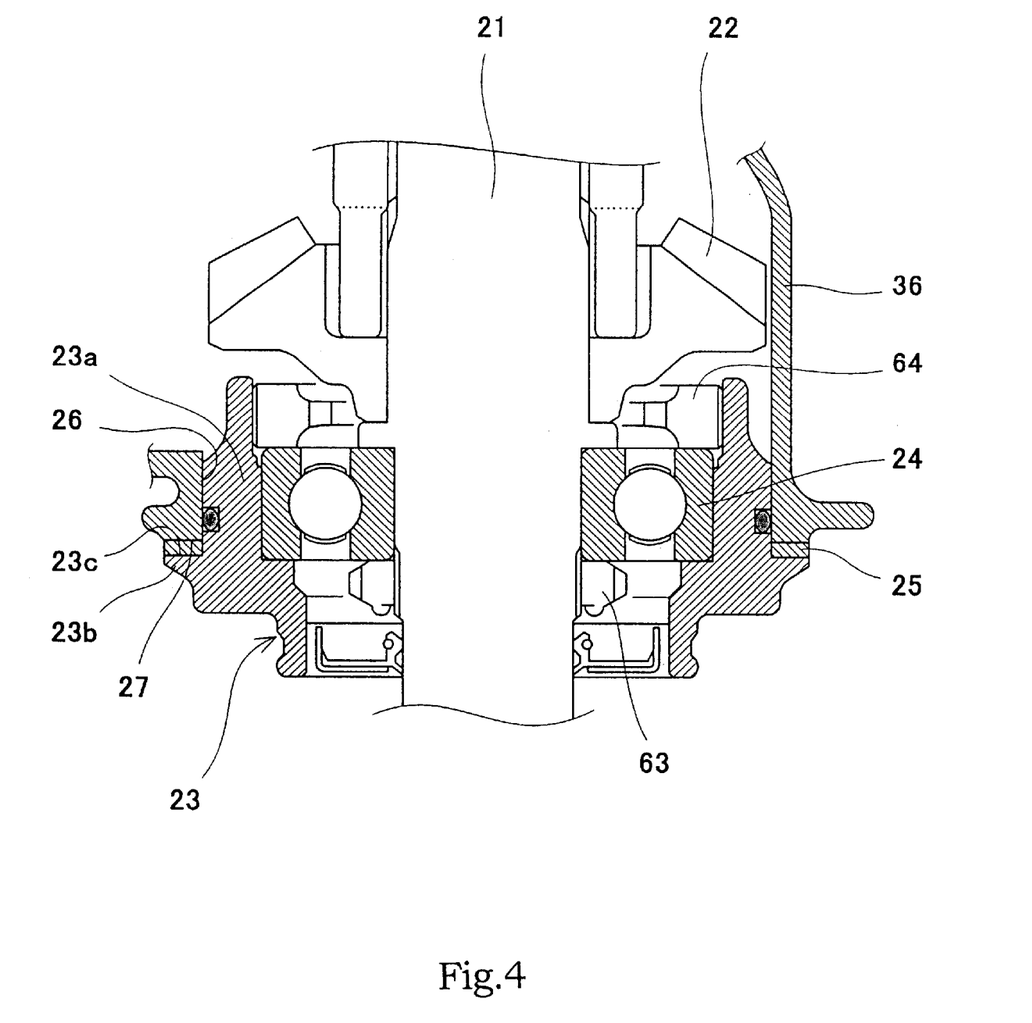
FIG. 4 is an enlarged cross-sectional view sowing a portion of the engine of FIG. 1, including a second support member and its vicinity.

FIG. 2 is a cross-sectional view showing a portion of the engine 50 in which the output shaft 11 and the drive shaft 21 of FIG. 1 and their vicinities are enlarged. FIG. 3 is an enlarged cross-sectional view showing a first support member 13 for supporting the output shaft 11 and its vicinity and FIG. 4 is an enlarged cross-sectional view showing a second support member 23 for supporting the drive shaft 21 and its vicinity. With reference to FIGS. 2 to 4, characteristics of the present invention will be described in detail.

As described above, the output shaft 11 of the gear-type transmission unit 40 is provided with the driving bevel gear 12 at one end thereof situated closer to the central portion of the engine 50 and the gear 16 for driving the output shaft 11 at the other end thereof situated closer to the side portion of the engine 50. The output shaft 11 and the gear 16 for driving the output shaft 11 are connected by a spline structure. In FIGS. 2 and 3, reference numeral 17 denotes a circlip. The circlip 17 prevents detachment of the gear 16 from the output shaft 11. The first support member 13 is provided between the gear 16 and the driving bevel gear 12.

The output shaft 11 is rotatably supported by the first support member 13 via a bearing 14 provided inside of the first support member 13. The output shaft 11 is positioned axially with respect to the first support member 13 by means of a nut 61 and a fixing member 62. A support boss 32 is formed inside of the gear case 36 to serve as a fitting portion for fitting the first support member 13. A support hole 32b into which the first support member 13 is to be fitted is formed in the support boss 32. A fitting face 32c is formed at an end face of the support boss 32 that is closer to the gear 16. A screw hole is formed in the fitting face 32c to allow the first support member 13 to be fixed by means of bolts 18. The first support member 13 includes a shaft portion 13a fitted into the support hole 32b and a flange portion 13b for fixing the first support member 13 to the fitting face 32c. The first support member 13 can be attached/detached to/from the support boss 32 by removable attachment of the bolts 18. A plurality of bolts 18 are provided in a circumferential direction of the output shaft 11 to fix the first support member 13 to the support boss 32, although only one of them is shown in FIGS. 2 and 3. An inner diameter of the support hole 32b of the support boss 32 (an outer diameter of the shaft portion 13a of the first support member 13) is made larger than an outer diameter of the driving bevel gear 12 provided on the output shaft 11, and the first support member 13 can be moved in a direction from the driving bevel gear 12 toward the gear 16 (away from the belt converter 55) to be taken out when the bolts 18 are removed.

A first shim 15 is interposed between the fitting face 32c of the support boss 32 and a flange face 13c of the flange portion 13b of the first support member 13. An axial position of the output shaft 11 with respect to the gear case 36, and hence, an axial position of the driving bevel gear 12 with respect to the gear case 36, can be adjusted according to the thickness of the first shim 15.

The drive shaft 21 is situated between the driving bevel gear 12 of the output shaft 11 and the belt converter 55 in a right and left (width) direction of the engine 50 and provided in a direction orthogonal to the output shaft 11 in the gear case 36 (see FIG. 1). An end portion of the drive shaft 21 is rotatably attached to an end portion of the gear case 36 of the crank case by the second support member 23. More specifically, a fitting hole 26 is formed in a wall portion of the gear case 36 which has a wall face substantially orthogonal to the drive shaft 21 such that it penetrates through the wall portion in a direction orthogonal to the output shaft 11. The second support member 23 is removably fitted into the fitting hole 26. A fitting face 27 is formed in the vicinity of the fitting hole 26 in an outer wall face of the gear case 36.

The second support member 23 includes a shaft portion 23a fitted into the fitting hole 26 formed in the gear case 36 and a flange portion 23b for fixing the second support member 23 to the fitting face 27 of the gear case 36. The drive shaft 21 is rotatably held by a bearing 24 provided inside of the second support member 23. The drive shaft 21 is positioned axially with respect to the second support member 23 via the bearing 24 by means of a nut 63 and a fixing member 64. The shaft portion 23a of the second support member 23 so structured is fitted into the fitting hole 26 of the gear case 36. The flange portion 23b of the second support member 23 is fixed to the gear case 36. Since an inner diameter of the fitting hole 26 of the gear case 36 is made larger than an outer diameter of the driven bevel gear 22 fixed to the drive shaft 21, the drive shaft 21 can be taken out through the fitting hole 26.

As described above, the drive shaft 21 is rotatably supported by the second support member 23 via the bearing 24. The second support member 23 removably attached to the gear case 36 is fixed to the gear case 36 by means of a plurality of bolts, although these bolts are not shown in FIGS. 2 and 4.

A second shim 25 is interposed between the fitting face 27 of the gear case 36 and the flange face 23c of the flange portion 23b of the second support member 23. An axial position of the drive shaft 21 with respect to the gear case 36, and hence, an axial position of the driven bevel gear 22 with respect to the gear case 36, can be adjusted according to the thickness of the second shim 25.

The purpose of adjusting the thickness of the first shim 15 and the thickness of the second shim 25 for adjustment of the axial position of the output shaft 11 and the axial position of the drive shaft 21 is to adjust tooth contact between the driving bevel gear 12 and the driven bevel gear 22.

An opening 37 is formed in the wall portion of the gear case 36 that is closer to the gear 16 of the gear-type transmission unit 40 such that it is sufficiently large to enable the gear 16 or the first support member 13 to pass therethrough. The opening 37 is closed by a lid member 33 attached to the gear case 36. An oil filler 34 can be attached to the lid member 33. The lid member 33 is fixed to the gear case 36 by means of bolts 35. The lid member 33 can be attached/detached to/from the gear case 36 by removable attachment of the bolts 35. A plurality of bolts 35 are provided in a circumferential direction of the output shaft 11 to fix the lid member 33 to the gear case 36, although only one of them is shown in FIG. 2.

Prior to assembly of the engine 50, the first and second shims 15, 25 having thicknesses for moderate tooth contact between the driving bevel gear 12 and the driven bevel gear 22 are selected. By using the first and second shims 15, 25 so selected, the engine 50 is assembled.

For re-adjustment or re-check of the tooth contact after completion of the assembly of the engine 50, it is necessary to detach the first and second shims 15, 25 from the engine 50. For adjustment of the tooth contact between the driving bevel gear 12 and the driven bevel gear 22 after completion of the assembly of the engine 50, it is necessary to prepare the first and second shims 15, 25 having various thicknesses and select the shims 15, 25 having appropriate thicknesses by attaching/detaching these shims to/from the engine 50. That is, after the assembly of the engine 50, it is necessary to detach the first and second shims 15, 25 attached to the gear case 36 for re-adjustment and re-check of the tooth contact.

Hereinafter, an operation procedure for detaching the first and second shims 15, 25 will be explained.

To detach the first shim 15 attached to the gear case 36 in the state shown in FIGS. 2, 3, initially, the bolts 35 for fixing the lid member 33 to the gear case 36 are removed to allow the lid member 33 to be detached from the gear case 36. Thereby, the opening 37 of the gear case 36 is exposed.

Subsequently, a tool is inserted through the opening 37 to remove the circlip 17 from the output shaft 11. The circlip 17 is taken out of the gear case 36 through the opening 37.

Then, a tool is inserted through the opening 37 to detach the gear 16 from the output shaft 11. The gear 16 is taken out of the gear case 36 through the opening 37.

Thereafter, a tool is inserted through the opening 37 to remove the bolts 18 for fixing the first support member 13 to the support boss 32. The first support member 13, together with the output shaft 11, is taken out of the gear case 36 through the opening 37.

It should be noted that it is not necessary to detach the gear 16 from the output shaft 11 if the bolts 18 are positioned so that the bolts 18 can be removed in the state in which the gear 16 is attached to the output shaft 11 and the opening 37 is sufficiently large to allow the gear 16 and the first support member 13 to pass therethrough.

Finally, the first shim 15 is taken out of the gear case 36 through the opening 37. To assemble a new first shim 15 different in thickness from the detached first shim 15 into the gear case 36, the operation procedure for detaching the first shim 15 described above is reversed.

To detach the second shim 25 attached to the gear case 36 in the state shown in FIGS. 2, 4, initially, the bolts for fixing the second support member 23 to the gear case 36 are removed to allow the second support member 23 together with the drive shaft 21 to be detached from the gear case 36. Thereby, the second shim 25 can be detached.

To assemble a new second shim 25 different in thickness from the detached second shim 25 into the! engine 50, the second support member 23 supporting the drive shaft 21, together with the drive shaft 21, is attached to the gear case 36 by means of the bolts, with the new second shim 25 being in abutment with the fitting face 27 of the gear case 36.

As should be appreciated from the above description, according to the structure described above, since it is not necessary to provide the gear case as the part separable from the gear case 36 laterally of the gear case 36, a dimension of the engine 50 in the width direction thereof can be reduced. In addition, the number of parts and weight of the engine can be reduced.

Further, if the drive shaft 21 provided in the direction orthogonal to the crank shaft 51 is provided together with the gear-type transmission unit 40 in the gear case 36 to reduce the width of the engine 50, the first shim 15 can be changed without the necessity of disassembling a big part of the engine such as the gear case 36. Consequently, the tooth contact between the driving bevel gear 12 and the driven bevel gear 22 can be easily adjusted and checked after the assembly of the engine 50.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A power transmission device of an engine comprising:
   an output shaft of a gear-driven transmission unit which is provided in parallel with a crank shaft of the engine and provided with a driving bevel gear at one end thereof, a driving force from the crank shaft being transmitted to the output shaft;
   a drive shaft placed in a direction orthogonal to the output shaft and provided with a driven bevel gear which meshes with the driving bevel gear;
   a gear case formed integrally with a crank case for accommodating the gear-driven transmission unit and supporting a shaft situated in a previous stage of the output shaft at both ends of the shaft;
   a lid member;
   a first support member;
   a first shim;
   a second support member; and
   a second shim; wherein
      an opening is formed in the gear case to allow the output shaft to be pulled out of the gear case in a direction from the one end of the output shaft at which the driving bevel gear is provided toward the other end of the output shaft,
      the lid member is removably attached to the gear case such that it closes the opening,
      the first support member is removably attached to the gear case for rotatably supporting the output shaft,
      the first shim is interposed between the first support member and the gear case,
      the second support member is removably attached to the gear case for rotatably supporting the drive shaft, and
      the second shim is interposed between the second support member and the gear case.

2. The power transmission device of the engine according to claim 1, wherein the engine comprises a belt-driven transmission unit for transmitting the driving force of the crank shaft to the gear-driven transmission unit, and
   the drive shaft is situated in the gear case between the belt-driven transmission unit provided in a side portion of the crank case and the gear-driven transmission unit provided in the gear case.

3. The power transmission device of the engine according to claim 2, wherein the first support member supports the output shaft at a central portion thereof to prevent the output shaft from moving in an axial direction thereof,
   the output shaft is provided with the driving bevel gear in the gear case, which is situated closer to the belt-driven transmission unit than the first support member,
   the output shaft is provided with a gear for driving the output shaft in the gear case, which is situated farther from the belt-driven transmission unit than the first support member,
   the gear case has the opening formed laterally of the gear for driving the output shaft, and the opening is sufficiently large to allow the gear for driving the output shaft and the first support member to pass therethrough.

4. The power transmission device of the engine according to claim 3, wherein the gear case includes a support boss having a support hole inside thereof, the first support member includes a shaft portion for supporting the output shaft via a bearing and a flange portion having a flange face facing toward an axial direction of the output shaft, the shaft portion of the first support member is inserted into the support hole, and an end face of the support boss and the flange face of the first support member are connected via the first shim to allow an axial position of the output shaft with respect to the gear case to be regulated.

5. The power transmission device of the engine according to claim 1, wherein the second support member supports the drive shaft to prevent the drive shaft from moving in an axial direction thereof, a fitting hole is formed in a wall portion of the gear case which has a wall face substantially orthogonal to the drive shaft such that the fitting hole is sufficiently large to allow the driven bevel gear to pass therethrough, and the second support member is removably fitted to the fitting hole.

6. The power transmission device of the engine according to claim 5, wherein the second support member includes a shaft portion and a flange portion having a flange face facing toward an axial direction of the drive shaft, a fitting face is formed in the vicinity of the fitting hole in an outer wall face of the gear case such that the fitting face is opposed to the flange face of the second support member, the shaft portion of the second support member is fitted into the fitting hole, and the fitting face and the flange face of the second support member are connected via the second shim to allow an axial position of the drive shaft with respect to the gear case to be regulated.

* * * * *